Oct. 3, 1972 V. EGGER ET AL 3,695,854

METHOD OF PRODUCING A MAGNETIC LAYER AND RESULTANT PRODUCT

Filed June 8, 1970 2 Sheets-Sheet 1

INVENTORS
VIKTOR EGGER
ARNULF LILL
WERNER METZDORF

BY Hill, Sherman, Meroni, Gross & Simpson ATTORNEYS

METHOD OF PRODUCING A MAGNETIC LAYER AND RESULTANT PRODUCT

Filed June 8, 1970 2 Sheets-Sheet 2

INVENTORS
VIKTOR EGGER
ARNULF LILL
WERNER METZDORF

BY Hill, Sherman, Meroni, Gross & Simpson
ATTORNEYS

United States Patent Office 3,695,854
Patented Oct. 3, 1972

3,695,854

METHOD OF PRODUCING A MAGNETIC LAYER AND RESULTANT PRODUCT

Viktor Egger, Arnulf Lill, and Werner Metzdorf, Munich, Germany, assignors to Siemens Aktiengesellschaft, Berlin and Munich, Germany Filed June 8, 1970, Ser. No. 44,398
Claims priority, application Germany, June 11, 1969, P 19 29 687.8
Int. Cl. G11c *11/04;* C23b *5/50, 5/58*
U.S. Cl. 29—183.5 12 Claims

ABSTRACT OF THE DISCLOSURE

Method of producing a magnetic storage layer having uniaxial anisotropy which involves depositing a fine grained smooth surfaced non-magnetic metal onto a carrier wire, applying a second non-magnetic layer having a roughened surface over the first layer, and then applying a ferro-magnetic layer over the roughened surface.

BACKGROUND OF THE INVENTION

Field of the invention

This invention is in the field of making magnetic storage devices of the wire type having a thin magnetic layer with uniaxial anisotropy wherein an intermediate roughened layer of a non-magnetic metal such as copper or gold is interposed between the carrier wire and the ferromagnetic outer layer to improve the magnetic properties of the storage device.

DESCRIPTION OF THE PRIOR ART

Magnetic storage devices in the form of plated wires are of great importance in the electronic data processing and telephone switching fields because they can be produced and tested easily and economically in wire drawing equipment, and they are very suitable for the so-called NDRW system, i.e., the Non-Destructive Read and Write system. The ability to provide readability without destruction, however, requires a unique set of magnetic characteristics in the wire.

The reading of information from a thin magnetic layer with uniaxial anisotropy is usually accomplished by establishing a reading pulse in the direction of hard magnetization, i.e., vertical to the preferred axis by sending a current pulse through the word line. If the magnetic field remains sufficiently above the anisotropy field strength $H_k$, the magnetization will return to the original easy direction after the reading pulse is switched off. If the field which is produced by the reading pulse is sufficiently high above the value $H_k$, a domain splitting will occur in such a way that the magnetization of the read wire section falls one half into the positive and one half into the negative easy direction, so that the following reading pulse cannot induce an additional signal into the wire. In the case of an irregular splitting, a small residual signal will remain. Even if this signal were large enough to permit reading of the information, the split magnetizing state means a reduction in the effective bit current range. The bit current pulse is that which is sent through the carrier wire when feeding information, and produces a field in the easy direction. The limits of the splitting domains move under the influence of field pulses in the easy direction, i.e., under the influence of bit pulses and even more so under the combined influence of a stray field coming from an adjacent word line.

During an NDRW operation, several stored words are on one word line. This arrangement of stored words makes it impossible to avoid the above-described domain splitting by reading with word fields which are less than or equal to the anisotropy field strength $H_k$ and feeding with signals which are equal to or less than $H_k$, although this method would be possible from the standpoint of signal amplitude.

Typically, a copper wire containing about 2% beryllium is used as the carrier wire, since it has particularly good mechanical properties. Such wire, however, may have imperfections in the surface such as indentations, grooves, or oxidized deposits of beryllium at its surface. Consequently, when a ferromagentic layer such as an iron-nickel alloy of the "Permalloy" type is directly deposited onto such surface, the storage capacity of the magnetic layer is significantly reduced along those defective areas.

It has previously been suggested that the lack of uniformity of the carrier wire surface can be diminished by means of electro-deposition of a fine grained deposit of copper or gold, deposited at a thickness measured in microns. The provision of such a layer makes it easier to deposit the ferromagnetic layer on the wire, resulting in a proportionately low bit current and low word current and also provides a small coercive field strength. This leads to the result that previously recorded bits may interfere with subsequently recorded bits at another storage location on the same wire.

SUMMARY OF THE INVENTION

In accordance with the present invention, the possibility of domain splitting with field strengths equal or greater than $H_k$ in a magnetic storage layer formed on a carrier wire is reduced by interposing a non-magnetic metal layer with a roughened surface between a non-magnetic metal layer immediately adjacent the wire periphery and the ferromagnetic storage layer. In doing so, the coercive field strength is increased to a degree that the sensitivity of the ferromagnetic layer to disturbances of the feed information is essentially reduced, and an improved NDRW operation of the magnetic storage device becomes possible. The other magnetic layer parameters such as anisotropy field strength, angle dispersion, magnitude of the word and bit currents which are needed for writing or reading are only changed in minor degrees.

The preferred non-magnetic materials for use in accordance with the present invention are electro-deposited copper and gold. One method for the production of the desired surface roughness is to deposit a coarsely crystalline metal layer on the carrier wire. The conditions of electrodeposition are controlled so that the distances between the peaks of the undulations in the roughened surface is about twice as large as the thickness of the characteristic "Bloch Wall." The term "Bloch Wall" refers to the transition layer which separates adjacent domains magnetized in different directions. For an explanation of this effect, and calculations of typical "Bloch Wall" dimensions and wall energies, reference is invited to "Introduction to Solid State Physics," Second Edition by Kittel (John Wiley & Sons, 1956; pp. 432–435). These walls generally have a thickness of about 500 to 1000 angstrom units. The irregularites in the electrodeposited layer may have peak to peak distances which are shorter or longer then the figure of twice the "Bloch Wall" thickness, but these have a lower influence on the coercive field strength.

The depth of the undulations in the surface also has an influence on the coercive field strength of the storage layer which is applied over it. Generally, the coercive field strength increases with increasing roughness, but providing too rough a surface leads to other disadvantages. Consequently, we prefer to limit the depth of the undulations, namely, the peak to valley dimension of the roughened layer to no more than 15% of the thickness of the ferromagnetic layer.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
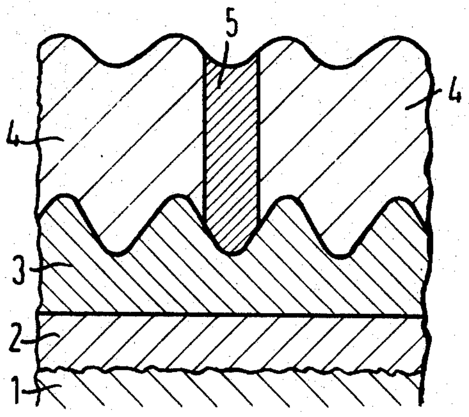
FIG. 1 is a cross-sectional view, greatly enlarged, of an improved magnetic storage device produced according to the present invention.

In FIG. 1, reference numeral 1 has been applied to a carrier wire such as a copper-beryllium wire having an inherently rough surface. A smoothing copper layer 2 is first electro-deposited over the copper wire 1. Next, a roughened copper layer 3 is deposited over the smooth layer 2 by electrodeposition.

The application of a copper cyanide bath has been particularly effective for the production of the roughened layer 3. Such a bath typically has a composition as follows:

| | G./l. |
|---|---|
| KCN | 40–60 |
| CuCN | 20–40 |
| $NaKC_4H_4O_6\cdot 4H_2O$ (sodium potassium tartrate) | 10–30 |

The deposition is carried out using a pH of about 11.5, a bath temperature of 15 to 60° C., and a current density of 4 to 16 amperes per square decimeter.

A particularly preferred bath composition for depositing a coarsely crystalline layer of copper is the following:

KCN—55 g./l.
CuCN—33 g./l.
$NaKC_4H_4O_6\cdot 4H_2O$—25 g./l.
pH—11.5
Temperature—35° C.
Current density—12 amps/sq. dm.

Subsequently, a ferromagnetic layer 4 is applied over the roughened copper layer 3 to a thickness of about 0.5 micron. The plating conditions under which this deposition occurred are given in the following table:

$NiCO_4\cdot 6H_2O$—215 g./l.
$(NH_4)Fe(SO_4)_2\cdot 6H_2O$—8 g./l.
$H_3BO_3$—25 g./l.
NaCl—10 g./l.
$(NH_2)_2$ CS (thiourea)—80 mg./l.
$Na_2SO_4$—0.3 g./l.
pH—3.1
Temperature—31° C.
Current density—9.8 amps/sq. dm.

Still another set of plating conditions for deposition of the nickel-iron layer is given in the following table:

$Ni(NH_2SO_3)_2\cdot 4H_2O$—385 g./l.
$FeSO_4\cdot 7H_2O$—8 g./l.
$NiCl_2\cdot 6H_2O$—5 g./l.
$H_3BO_3$—30 g./l.
Brightening agent—5 mg./l.
pH—4.0
Temperature 60° C.
Current density—15–30 amps/sq. dm.

Under the conditions of plating enumerated above, the distance between the undulations of the roughened copper layer 3 averages about twice the width of the "Bloch Wall" which is illustrated diagrammatically at reference numeral 5 in FIG. 1. The depth of the undulations in the roughened surface of the copper layer 3 should not exceed about 15% of the thickness of the ferromagnetic layer 4. With the type of structure shown in FIG. 1, the "Bloch Wall" lies in a valley of the surface of the layer so that it takes a greater amount of energy to cause shifting of the "Bloch Wall" to a different position than if the wall were positioned on a substantially smooth surface.

Figure 3:
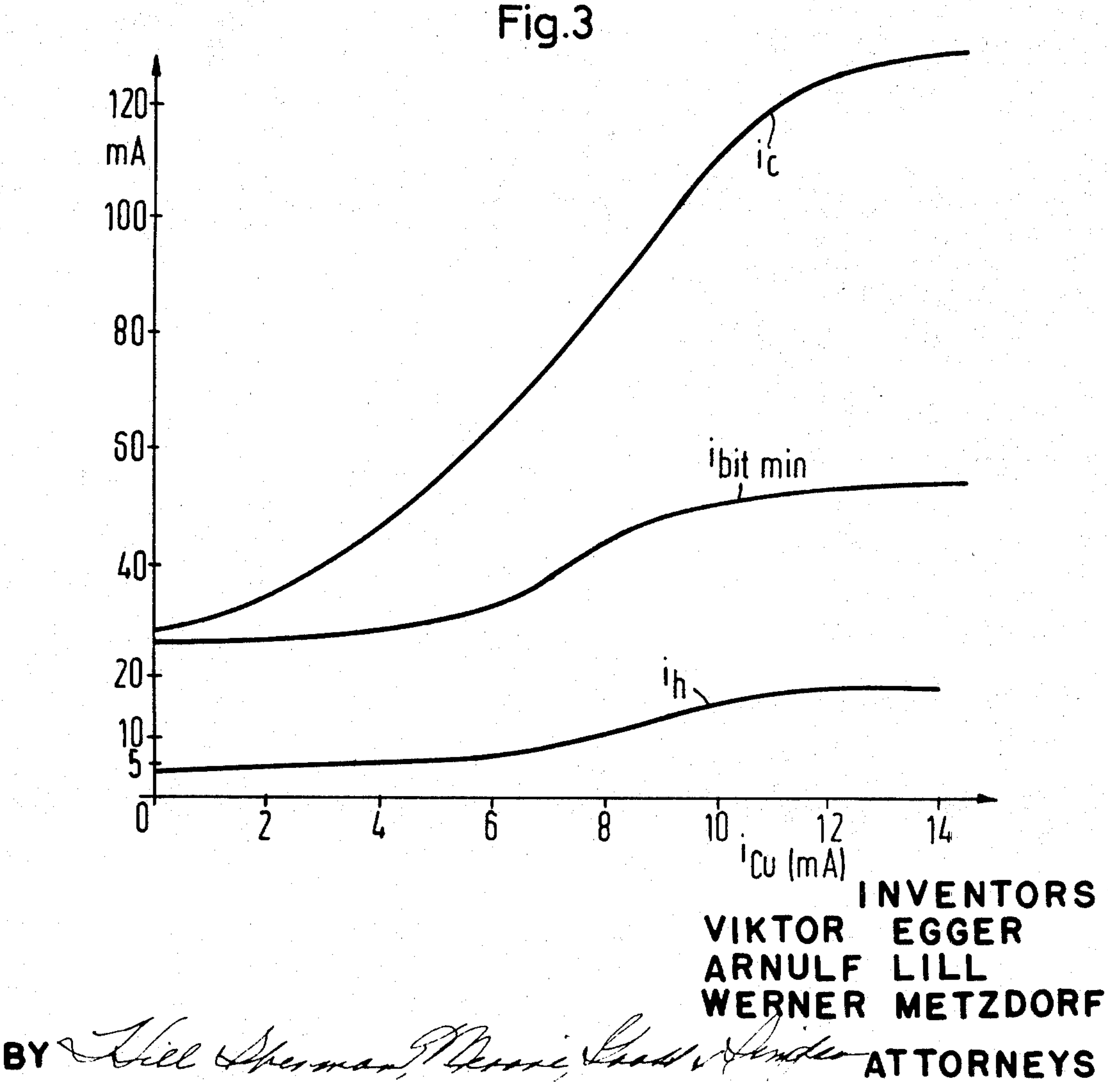
FIG. 3 is a graph which shows the variation of various magnetic parameters in the product based upon variations in the electroplating current.

Some of the magnetic characteristics of the wire shown in FIG. 1 are illustrated in FIG. 3. The minimum feeding current $i_{bit\ min.}$, the coerciev current $i_c$ of the wall movement and the zero passage of the feeding hysteresis $i_h$ are plotted as a function of the coating $i_{Cu}$ in the electrodeposition cell. It will be seen that $i_c$ and $i_{bit\ min.}$ become more divergent as the plating current increases until a value of about 12 milliamperes is reached at which time the difference becomes substantially constant.

Figure 4:
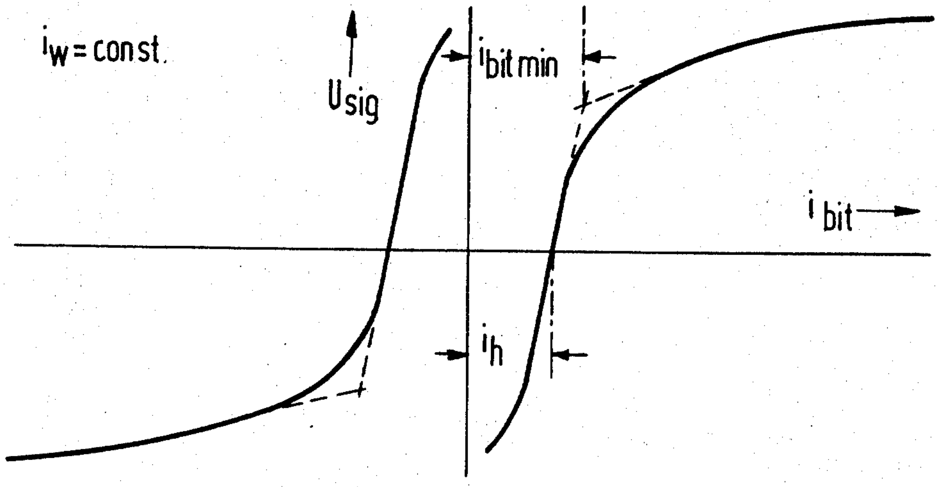
FIG. 4 is a graph showing the relationship between signal voltage and bit current of the improved element of the present invention.

FIG. 4 illustrates still another characteristic of the coated wire element produced according to the present invention. The dependence of the signal voltage $U_{sig}$ on the bit current $i_{bit}$ is illustrated here. In addition, the currents $i_h$ and $i_{bit\ min.}$ are also illustrated. The hysteresis current $i_h$ is the minimum current which has to flow as a bit current to be able to transfer formerly fed information such that when the old information is read, there does not appear more than one output signal. The actual bit current during feeding thus must be higher than this minimum current in any case. In order to apply controls as efficiently as possible, a low value of hysteresis current is desired but on the other hand the current $i_h$ must not be too small because in that case the information cannot be read without destruction. Consequently, it is desirable to have an $i_h$ value closely below $i_{bit\ min.}$ where $i_{bit\ min.}$ is in the range from 30 to 50 milliamperes. The value of $i_h$ is influenced by the surface structure of the roughened copper layer according to the present invention, and also by the crystalline structure of the magnetic layer. It also depends upon the conductor geometry and the layer thickness.

The coercive current of the wall movement $i_c$ is produced by the current which flows through the carrier wire as bit current and which produces a field in the easy direction without simultaneously producing a field in the hard direction caused by a current in the word line which destroys information which had previously been fed in by means of a wall movement.

The current $i_{bit\ min.}$ represents the low limit of the bit current which is usable for a practical operation.

Figure 2:
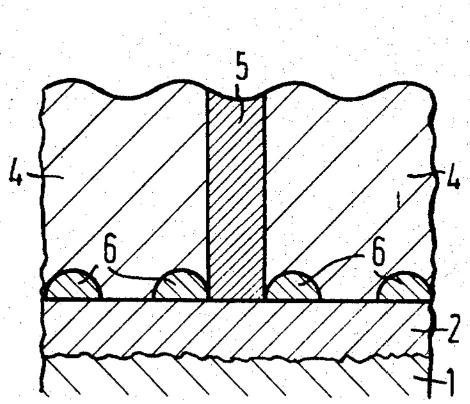
FIG. 2 is a greatly enlarged cross-sectional view of a modified form of the invention.

Another form of the invention is illustrated in FIG. 2 of the drawings wherein the copper wire base 1 is shown covered with a smooth surface copper layer 2. In this instance, however, the roughened copper surface over the smooth surface layer 2 takes the form of discrete deposits 6 of copper. This type of deposit can be produced through the use of a sulfuric acid type copper plating bath, having a composition as given below:

| | G./l. |
|---|---|
| $CuSO_4\cdot 5H_2O$ | 180 to 220 |
| $H_2SO_4$ | 10 to 30 |

The bath temperature ranges from about 20 to 30° C., and current densities of from 2 to 4 amperes per square decimeter are appropriate.

The advantage of using the structure of FIG. 2 resides in the fact that less metal is deposited, so that the diameter of the carrier wire 1 is not significantly changed so that its reaction to mechanical stress is improved.

A structure of the type shown in FIG. 2 was produced in a plating bath containing 200 grams per liter of copper sulfate, and 15 grams per liter of sulfuric acid. The temperature plating was 25° C. The magnetic layer 4 was produced as specified in the first example.

Figure 5:
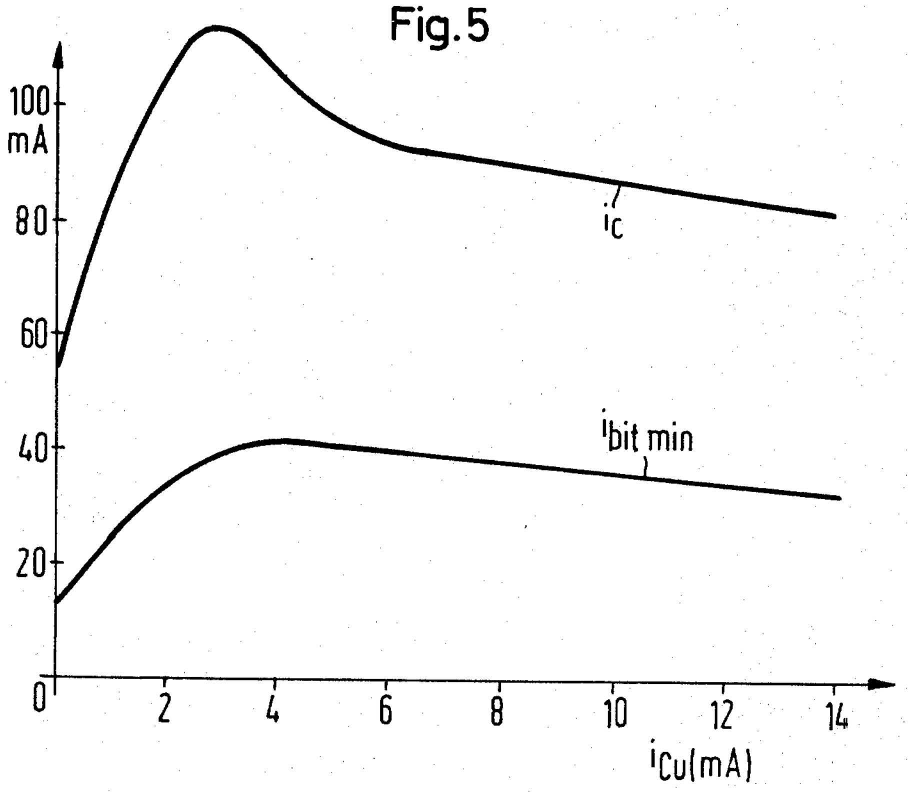
FIG. 5 is a graph showing the relationship of various magnetic parameters as a function of the current in the electroplating cell, using a modified form of the present invention.

FIG. 5 of the drawings illustrates the dependence of $i_{\text{bit min.}}$ and $i_c$ of the structure shown in FIG. 2 upon the plating current. It will be seen that there is a maximum $i_c$ at about 3 milliampers. This maximum exists at a point of optimum surface roughening.

It should be understood that the particular current values which we have given in this specification are derived from a specific experimental storage unit. The shape of the curves, however, is not dependent upon the specific structure used, although the absolute values of the currents will be different in different installations.

We claim as our invention:

1. The method of producing a magnetic storage layer having uniaxial anisotropy which comprises electro-depositing on a smooth surfaced non-magnetic carrier wire a non-magnetic metal layer having a roughened surface, and then applying a thin ferromagnetic layer over the roughened surface, said non-magnetic metal layer having un undulating surface with adjacent peaks spaced apart a distance equal to about twice the width of a Bloch Wall for the material of the ferromagnetic layer and the depth of the undulations of the undulating surface not exceeding about 15% of the thickness of the ferromagnetic layer.

2. The method of claim 10 in which said second non-magnetic metal layer is composed of copper.

3. The method of claim 10 in which said second non-magnetic metal layer is composed of gold.

4. The method of claim 10 in which said second non-magnetic metal layer is coarsely crystalline.

5. The method of claim 1 in which said second non-magnetic metal layer consists of spaced deposits along the smooth surface non-magnetic metal layer.

6. The method of claim 1 in which said non-magnetic metal is copper which is electrodeposited from a copper cyanide bath.

7. The method of claim 6 in which the electrodeposition takes place from a bath having the following composition:

| | G./l. |
|---|---|
| KCN | 40–60 |
| CuCN | 20–40 |
| $NaKC_4H_4O_6 \cdot 4H_2O$ | 10–30 |

said bath having a pH of about 11.5, and a temperature of from 15 to 50° C., said electrodeposit taking place at a current density of from 4 to 16 amperes per square decimeter.

8. The method of claim 1 in which said non-magnetic metal is copper deposited from a sulfuric acid copper bath.

9. The method of claim 8 in which the electrodeposition takes place from a bath having the following composition:

| | G./l. |
|---|---|
| $CuSo_4 \cdot 5H_2O$ | 180–220 |
| $H_2SO_4$ | 10–30 |

said bath being at a temperature of from 20 to 30° C., and said electro-deposition taking place at a current density of from 2 to 4 amperes per square decimeter.

10. The method in accordance with claim 1 in which a fine rained smooth surface non-magnetic metal is deposited on the carrier wire before applying the rough surface non-magnetic layer.

11. A magnetic storage device having uniaxial anisotropy and consisting essentially of a carrier wire, a smooth surfaced non-magnetic metal layer on said wire, a non-magnetic metal layer having an undulating surface on said smooth surface, and a thin ferromagnetic layer over said surface, the peaks of said undulating surface being spaced apart a distance equal to about twice the width of a Bloch Wall for the material of the ferromagnetic layer and the depth of the undulations of said undulating surface not exceeding about 15% of the thickness of the ferromagnetic layer.

12. The device of claim 11 in which said non-magnetic layers are composed of copper.

References Cited

UNITED STATES PATENTS

| | | | |
|---|---|---|---|
| 3,330,631 | 7/1967 | Tsu | 29—196.3 X |
| 3,370,929 | 2/1968 | Mathias | 29—196.3 X |
| 3,549,507 | 12/1970 | Semienko et al. | 29—196.3 X |
| 3,540,988 | 11/1970 | Wells et al. | 204—29 X |
| 3,616,290 | 10/1971 | Natick et al. | 204—27 |

ALLEN B. CURTIS, Primary Examiner

U.S. Cl. X.R.

29—196.3; 204—28, 29

UNITED STATES PATENT OFFICE

CERTIFICATE OF CORRECTION

Patent No. 3,695,854 Dated October 3, 1972

Inventor(s) Viktor Egger et al.

It is certified that error appears in the above-identified patent and that said Letters Patent are hereby corrected as shown below:

Column 3, line 64 reads:
"$NiCO_4 \cdot 6H_2O$ - 215g/l"
and it should read
--$NiSO_4 \cdot 6H_2O$ - 215g/l--

Column 4, line 23,
"coerciev" should read --coercive--.

Claim 1, line 7, "an undulating" should appear instead of --un undulating--.

Signed and sealed this 8th day of January 1974.

(SEAL)
Attest:

EDWARD M.FLETCHER,JR.
Attesting Officer

RENE D. TEGTMEYER
Acting Commissioner of Patents